United States Patent [19]
Nishtala et al.

[11] Patent Number: 5,987,579
[45] Date of Patent: *Nov. 16, 1999

[54] METHOD AND APPARATUS FOR QUICKLY INITIATING MEMORY ACCESSES IN A MULTIPROCESSOR CACHE COHERENT COMPUTER SYSTEM

[75] Inventors: Satyanarayana Nishtala, Cupertino; Zahir Ebrahim, Mountain View; William C. Van Loo, Palo Alto; Raymond Ng, Daly City; Louis F. Coffin, III, San Jose, all of Calif.

[73] Assignee: Sun Microsystems, Inc., Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/825,404

[22] Filed: Mar. 27, 1997

Related U.S. Application Data

[63] Continuation of application No. 08/414,921, Mar. 31, 1995, abandoned.

[51] Int. Cl.⁶ .................................................. G06F 12/00

[52] U.S. Cl. ........................ 711/169; 395/449; 395/445; 395/470; 395/495

[58] Field of Search .................................... 395/449, 445, 395/470, 495, 471, 473, 496; 711/122, 118, 143, 168, 144, 146, 169

[56] References Cited

U.S. PATENT DOCUMENTS

| | | | |
|---|---|---|---|
| 4,847,758 | 7/1989 | Olson et al. | 395/460 |
| 4,858,111 | 8/1989 | Steps | 395/470 |
| 5,210,848 | 5/1993 | Liu | 395/451 |
| 5,278,801 | 1/1994 | Dresser et al. | 365/230.02 |
| 5,325,508 | 6/1994 | Parks et al. | 395/445 |
| 5,396,619 | 3/1995 | Walton . | |
| 5,499,385 | 3/1996 | Farmwald et al. | 395/823 |
| 5,553,270 | 9/1996 | Rosenbluth | 395/496 |

*Primary Examiner*—Tod R. Swann
*Assistant Examiner*—Christopher S. Chow
*Attorney, Agent, or Firm*—Blakely Sokoloff Taylor & Zafman

[57] ABSTRACT

In a computer system including a packet-switched bus, a method for requesting transactions such that memory accesses are initiated quickly. A master transmits a first portion of a transaction request packet having multiple portion. A memory controller receives the first portion of the transaction request, which includes a row address portion of a memory address. The memory controller initiates a memory access by applying a row address strobe signal to the row of the memory location in response to receiving the first portion of the request packet, and the master transmits any remaining portion of the transaction request. After the full memory address has been received, it is determined whether data stored at the memory location is to be read from a source other than the memory location. The memory controller aborts the memory access by inhibiting assertion of a column access strobe signal to the memory location if the data is to be read from a source other than the memory location.

21 Claims, 11 Drawing Sheets

METHOD AND APPARATUS FOR QUICKLY INITIATING MEMORY ACCESSES IN A MULTIPROCESSOR CACHE COHERENT COMPUTER SYSTEM

This is a continuation of application Ser. No. 08/414,921 filed March 31, 1995.

FIELD OF THE INVENTION

The present invention relates generally to data communications in a computer system and more specifically to reducing unloaded system latency in uniprocessor and multiprocessor computer systems.

BACKGROUND OF THE INVENTION

A typical uniprocessor computer system includes a processor and an associated cache memory that stores a subset of the information stored by the system memory. The cache memory acts as a high speed source of information for instructions to be executed by the processor. When a processor requests to read information that is not stored in the cache memory, a "cache miss" occurs, and the cache must be refilled with information fetched from system memory. The processor is typically stalled while the information is fetched from system memory, and the time required to fill the cache after a cache miss greatly affects the system latency of a uniprocessor computer system.

Typical multiprocessor computer systems include multiple processors each having an associated cache memory. Cache misses in a multiprocessor system are complicated by the fact that the most recent copy of the requested data may reside in another cache rather than in system memory. A cache coherence protocol is often implemented to track where the most recent copy of cached information is currently located. Typically, each processor independently maintains a state for its cache entries, and when another processor requests data from system memory to fill its cache, each of the other processors determines whether it, instead of system memory, should source the data.

A typical prior mechanism for maintaining cache coherence in a multiprocessor computer system is a globally shared address bus to which the processors and the memory subsystem are coupled. Each processor "snoops" the memory address that is driven on the address bus to determine whether its cache should source the requested data. The memory subsystem typically queues the request. A processor indicates that its cache is to source the requested data by asserting a shared "ownership" line, and the memory subsystem flushes the request from its queue before initiating the memory access request if a processor asserts the ownership line. Common interconnects that include a globally shared address bus are typically optimized for high bandwidth and throughput at the expense of an increase in latency.

As computer systems and computer system components become faster and more complex, increasing the efficiency of the common interconnect, in terms of both physical implementation and resource allocation, becomes a paramount concern for system designers. Increasing the efficiency of the common interconnect for use in a cache coherent multiprocessor computer system may result in a number of architectural changes such that the time required to fill a cache after a cache miss may become important to the system latency of the computer system. The time required to fill a cache after a cache miss is particularly critical to the unloaded system latency wherein no memory access requests are queued up ahead of the cache fill request.

Ideally, the unloaded system latency should be of the order of the latency of the Dynamic Random Access Memory ("DRAM") devices that comprise the system memory. Therefore, cache coherence operations and memory access requests should be completed within the time allotted for servicing a memory access request, and memory accesses should be initiated as quickly as possible. However, the physical implementation of the common interconnect may make it difficult to quickly initiate system memory accesses. For example, an address bus may be multiplexed such that two or more bus cycles are required to convey an entire transaction request packet, which includes the memory address of the memory location to be accessed. Therefore, a mechanism that quickly initiates memory accesses when a memory address is conveyed over multiple bus cycles is needed to reduce unloaded system latency.

SUMMARY OF THE INVENTION

A method is described wherein memory access transactions are initiated quickly such that the unloaded system latency of a computer system is reduced. A master transmits a first portion of a transaction request having multiple portions, wherein the first portion of the transaction request includes bank select, SIMM select, and row address information. Prior to receiving subsequent portions of the transaction request, a memory controller initiates a memory access in response to receiving the first portion of the transaction request by applying a row address strobe signal to the memory location indicated by the bank select, SIMM select, and row address information. The master transmits the remaining portions of the transaction request.

After the full transaction request has been sent and received, coherency operations are performed and completed within a fixed amount of time prior to the time that a column address strobe signal is to be applied to the memory location. If the cache coherency operations determine that the memory access is to be aborted, the memory controller inhibits application of the column address strobe signal. Otherwise, the memory controller completes the memory access.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Described below is a mechanism for quickly initiating memory accesses such that the unloaded system latency of a common interconnect is reduced. Although the present invention is described with reference to specific circuits, block diagrams, signals, algorithms, etc., it will be appreciated that such details are disclosed simply to provide a more thorough understanding of the present invention. It will therefore be apparent that the present invention may be practiced without the specific details. In other instances, well known circuits are shown in block diagram form in order not to obscure the present invention unnecessarily.

Figure 1:
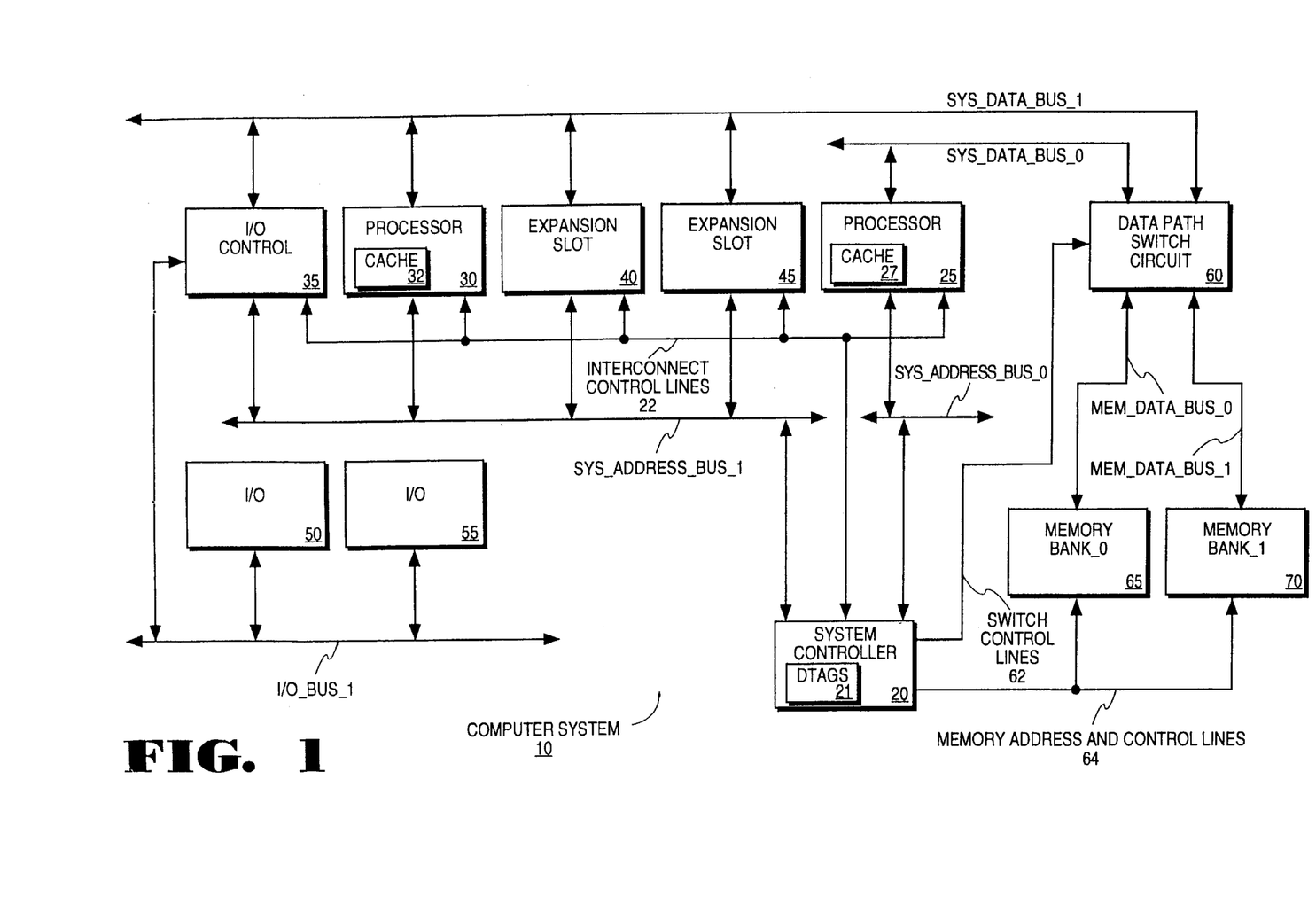
FIG. 1 shows a computer system according to one embodiment.

FIG. 1 shows an exemplary computer system and common interconnect. Further details of the common interconnect described herein may be found in U.S. patent application Ser. No. 08/451,175 now U.S. Pat. No. 5,634,068, designated as P731 and entitled "A Packet-Switched Cache Coherent Multiprocessor System," filed on even date herewith, and commonly assigned to Sun Microsystems, Inc., of Mountain View, Calif. The exemplary common interconnect provides for system scalability and increased interconnect frequencies by using multiple pairs of address and data buses.

Each system address bus is a synchronous packet-switched transaction request bus wherein transaction request packets are wider than the system address bus. Therefore, multiple bus clock cycles are required to convey the entire transaction request packet. According to the present embodiment, the physical address of the computer system is also wider than the system address bus; however, the present invention may find application whenever a transaction request is wider than the transaction request bus.

The specific embodiments described herein assume that each portion of a transaction request is transmitted in a single bus clock cycle. Thus, a multiple portion transaction request packet is described as a "multiple cycle" transaction request packet wherein each "cycle" of the transaction request is transmitted over a single bus clock cycle. It will be understood, however, that a portion of a multiple portion transaction request need not be transmitted in a single bus clock cycle. In fact, the transaction request bus need not be a synchronous bus or a packet-switched bus.

An access of a DRAM device typically requires a fixed amount of time to complete and comprises the assertion of a row address strobe ("$\overline{RAS}$") signal to select the desired row of the DRAM device followed by the assertion of a column address strobe ("$\overline{CAS}$") signal to select the desired column of the DRAM device. The minimum relative timing between assertion of the $\overline{RAS}$ signal and assertion of the $\overline{CAS}$ signal is typically fixed and known, and it is desirable to assert the $\overline{CAS}$ as soon as possible after asserting the $\overline{RAS}$ signal in order to reduce latency.

To reduce unloaded system latency, transaction request packets are structured such that the first cycle of the transaction request packet contains information sufficient to initiate a memory access. Depending on the size of system memory, it may be sufficient to convey the row address portion of the memory address during the first cycle of the memory access request packet and to complete transmission of the memory address during subsequent cycles of the memory access request packet. According to the present embodiment, the first cycle of the memory access request packet includes additional information for selecting the correct DRAM device and memory bank of the system memory.

A memory controller initiates a memory access by asserting the appropriate $\overline{RAS}$ signal upon receipt of the first cycle of the transaction request packet without waiting for the remainder of the memory address or the completion of coherency operations. Subsequent cycles of the transaction request packet convey the remainder of the memory address such that a coherency controller may perform coherency operations. The coherency controller completes coherency operations within a constant number of bus clock cycles and prior to the time that the $\overline{CAS}$ signal is to be asserted. The memory controller may then abort a memory access by inhibiting assertion of the $\overline{CAS}$ signal if the cache controller indicates that a cache of the computer system is to source the requested data. Alternatively, the memory access may be allowed to complete, and the resulting data may simply be ignored. Initiating a memory access as soon as the row address and device select information is made available combined with performing coherency operations prior to the time that the $\overline{CAS}$ signal is to be asserted allows the unloaded system latency to be reduced to approximately the latency of the DRAM devices of system memory.

Computer system 10 of FIG. 1 is a cache coherent multiprocessor system that generally comprises a system controller 20, processors 25 and 30, input and output ("I/O") controller 35, expansion slots 40 and 45, I/O devices 50 and 55, data path switch circuit 60, and system memory banks 65 and 70. Processors 25 and 30 are shown as including caches 27 and 32, respectively, and system controller 20 is shown as including a set of duplicate tags ("Dtags") that duplicate the cache tags of caches 27 and 32.

The common interconnect of computer system 10 operates synchronously and includes two pairs of associated system address and data buses. Each system address bus is a bidirectional packet-switched transaction request buses that may be used by the system components to request memory accesses and other types of transactions specified by the transaction set of the common interconnect. Processor 25 is coupled to a first address bus, SYS_ADDRESS_BUS_0, and a first data bus, SYS_DATA_BUS_0. Processor 30, I/O controller 35, and expansion slots 40 and 45 are coupled to a second system address bus, SYS_ADDRESS_BUS_1, and a second system data bus, SYS_DATA_BUS_1O. I/O controller 35 is also coupled to an I/O bus, I/O_BUS_1, for exchanging information with I/O devices 50 and 55. Both system address buses are coupled to system controller 20. Interconnect control lines 22 are used to coordinate the completion of transactions requested by system components via the system address buses. According to the present embodiment, each system address bus SYS_ADDRESS_BUS_n includes thirty-six address conductors An[35:0], the physical address space is forty-one bits PA[40:0] wide, and each transaction request packet requires two bus clock cycles to complete.

Each of the system data buses may be selectively coupled to one of the system memory banks 65 and 70 via data path switch circuit 60. System memory banks 65 and 70 are shown as being coupled to data path switch circuit 60 by memory data buses MEM_DATA_BUS_0 and MEM_DATA_BUS_1, respectively. Data path switch circuit 60 may be an N×M crossbar switch, wherein N is the total number of system data buses and M is the total number of memory data buses, and system controller 20 controls data path switch circuit 60 via switch control lines 62.

System controller 20 maintains cache coherency and manages the system memory so that system controller 20 may be regarded as being both a cache coherency controller and a memory controller. The functions of system controller 20 may be alternatively performed by distinct functional units. Further, cache coherency may be alternatively maintained in a distributed manner such as by a bus snooping scheme wherein each processor snoops a common bus.

To maintain cache coherence, system controller 20 stores a set of duplicate cache tags (Dtags) identical to the cache tags of all the caching masters of computer system 10. Dtags are not used when computer system 10 is implemented as a uniprocessor computer system comprising one pair of system address and data buses. When a transaction request packet is received, system controller 20 compares the cache state of a cache block in the duplicate cache tags and appropriately sends invalidation or copyback transactions to caching masters as indicated by the cache state. The duplicate tags mirror the caching masters' cache tags and eliminate false lookups in the caching masters' cache tags. To control system memory, system controller 20 provides memory control signals such as the memory address of a memory access, $\overline{RAS}$ signals, $\overline{CAS}$ signals, and write enable ("$\overline{WE}$") signals to the memory banks via memory address and control lines 64.

Figure 2:
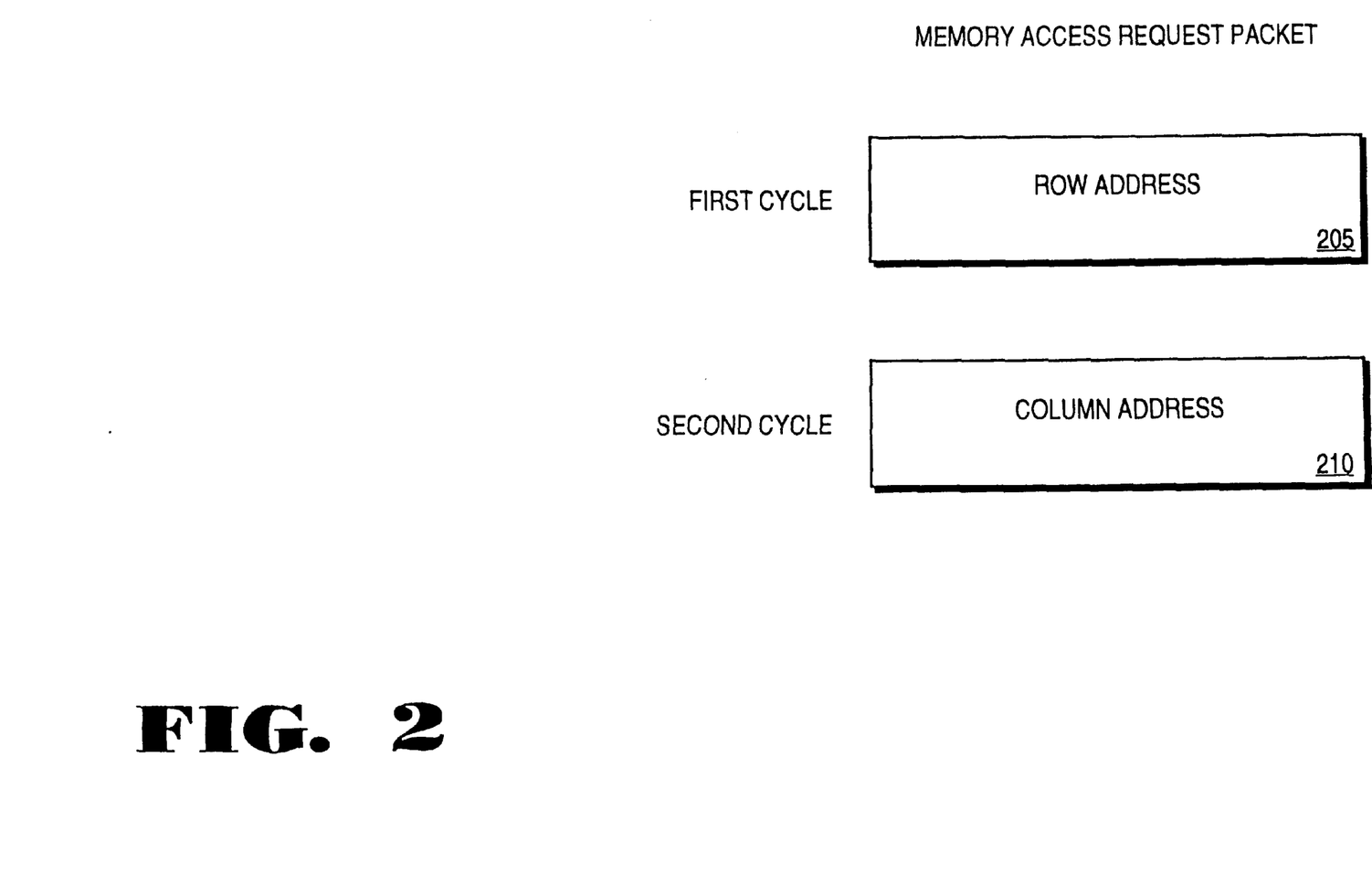
FIG. 2 shows a generalized transaction request packet format.

The size of system memory directly affects the number and selection of physical address bits that should be provided in the first cycle of a transaction request packet. At a minimum, it is desirable to provide the row address of the desired memory location in the first cycle of a multiple cycle transaction request. FIG. 2 shows a generalized multiple cycle transaction request packet wherein the row address is provided in the first cycle 205 of the request packet, and the column address is provided in the second cycle 210 of the request packet.

According to the present embodiment, each system memory bank may be implemented as one or more Single In-line Memory Modules ("SIMMS") that each typically comprise multiple DRAM devices. Therefore, there are multiple SIMMs that must be selected between in order to apply a $\overline{RAS}$ signal to the correct memory location.

Table 1 shows that SIMM sizes of 16 MB, 32 MB, 64 MB, and 128 MB are supported by computer system 10. The SIMM sizes shown in Table 1 indicate only those portions of a SIMM that store user accessible data, and those portions of a SIMM that store error correction coding ("ECC") information are not indicated. Thus, the actual sizes of the SIMMs supported by the computer system of the present embodiment are larger than indicated by Table 1.

TABLE 1

| | SIMM Types | |
|---|---|---|
| SIMM Size | Base Device Size | Number of Devices |
| 16 MB | 4 Mb (1 M × 4) | 36 |
| 32 MB | 16 Mb (2 M × 8) | 18 |
| 64 MB | 16 Mb (4 M × 4) | 36 |
| 128 MB | 64 Mb (8 M × 8) | 18 |

Figure 3:
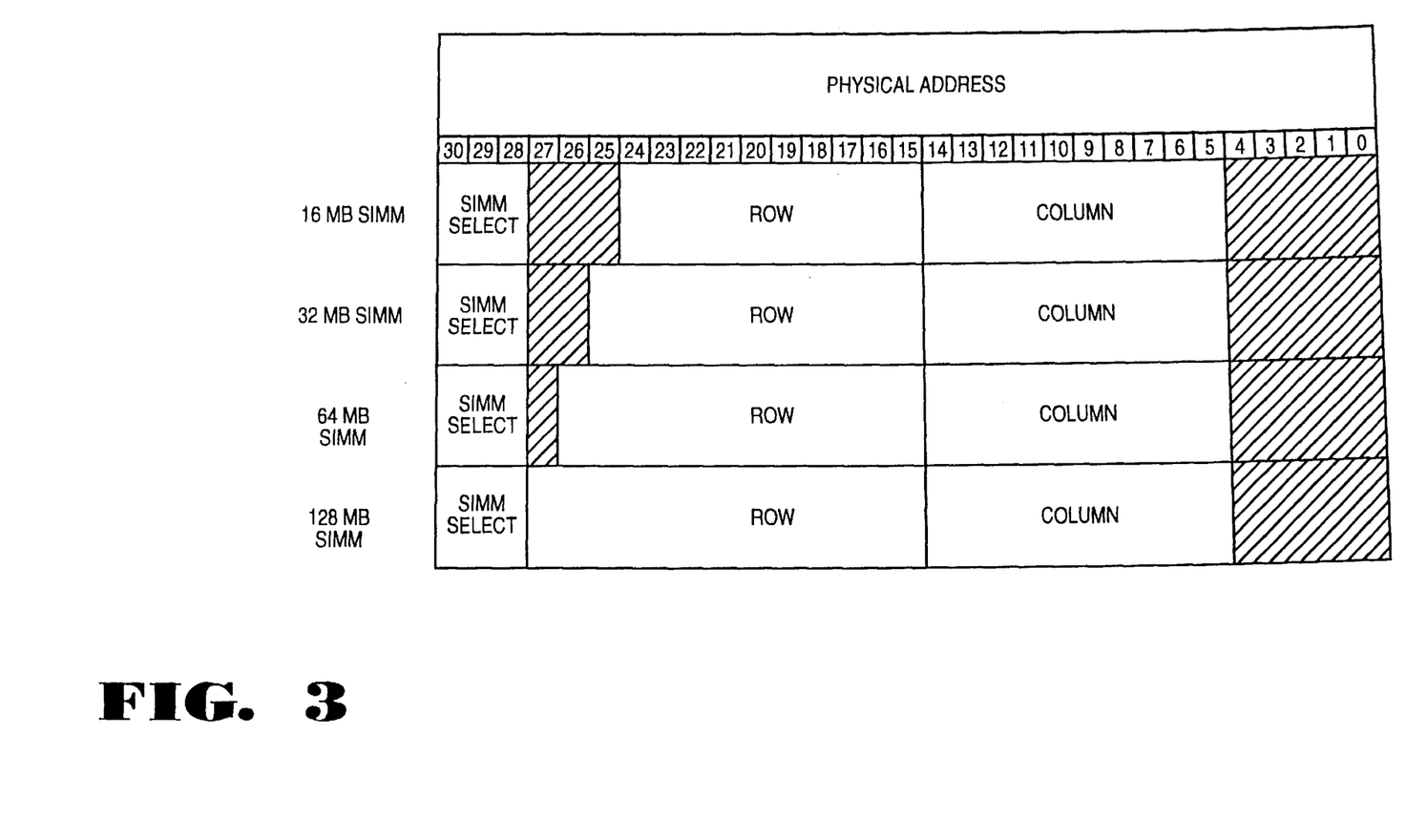
FIG. 3 shows memory address bit assignments for SIMMs of various sizes.

FIG. 3 graphically shows the number of bits required to select and address a SIMM for 16 MB, 32 MB, 64 MB, and 128 MB SIMMS. For the different SIMM types, as few as ten bits and as many as thirteen bits are required to provide a full row address, and as many as three bits are required to select a SIMM, assuming a maximum of eight SIMM pairs are accessible. The number of bits needed to select a SIMM thus depends on the number of SIMM pairs implemented by a system.

To allow the use of each type of SIMM shown in Table 1 and FIG. 3, sixteen physical address bits should be provided in the first cycle of a transaction request packet, and those sixteen physical address bits should be selected to provide the row address and SIMM select signals for memory access requests. More or less physical address bits may be required, depending on the size of the largest SIMM type. For the present embodiment, additional physical address bits are also required to select between the multiple system memory banks.

Figure 4:
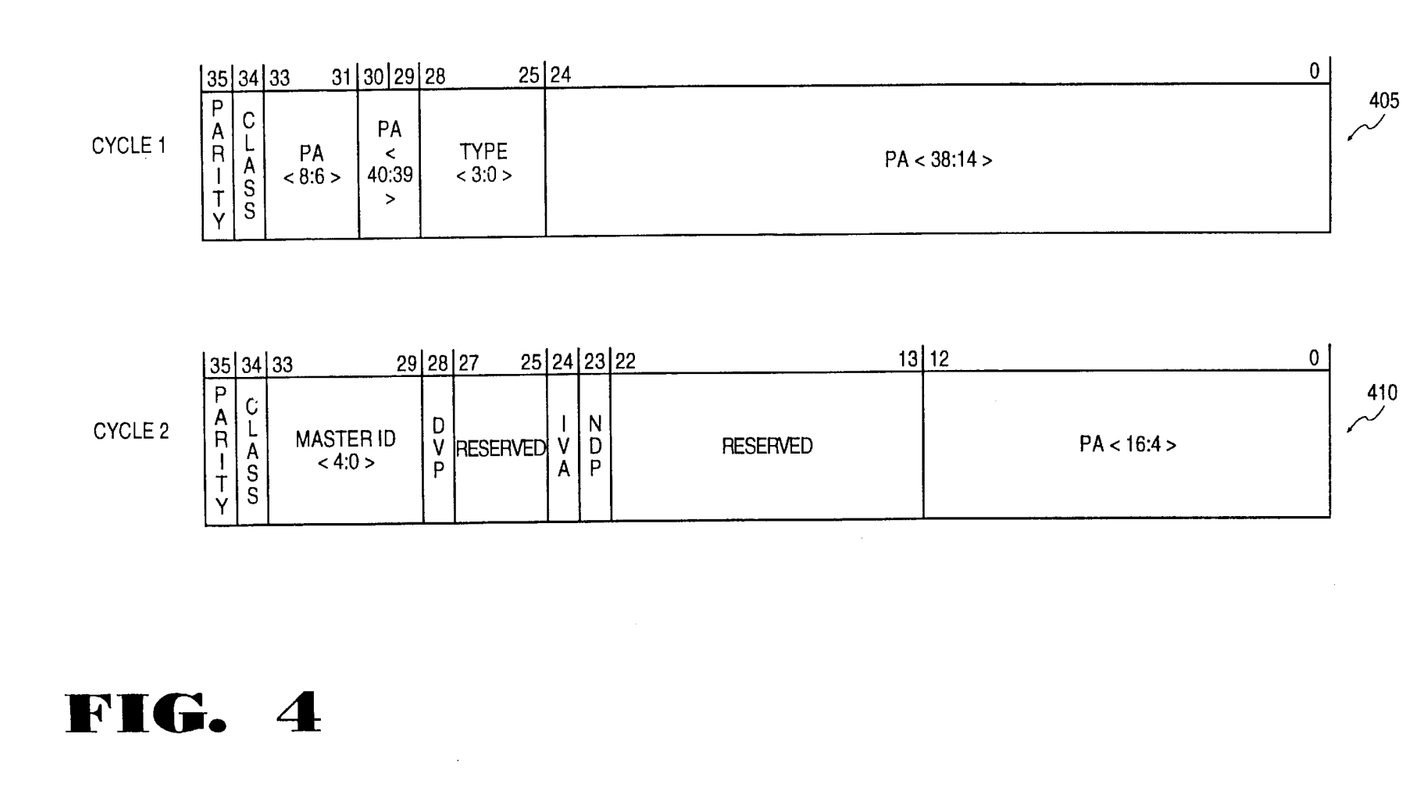
FIG. 4 shows the format of a cache coherent transaction request packet according to one embodiment.
Figure 5:
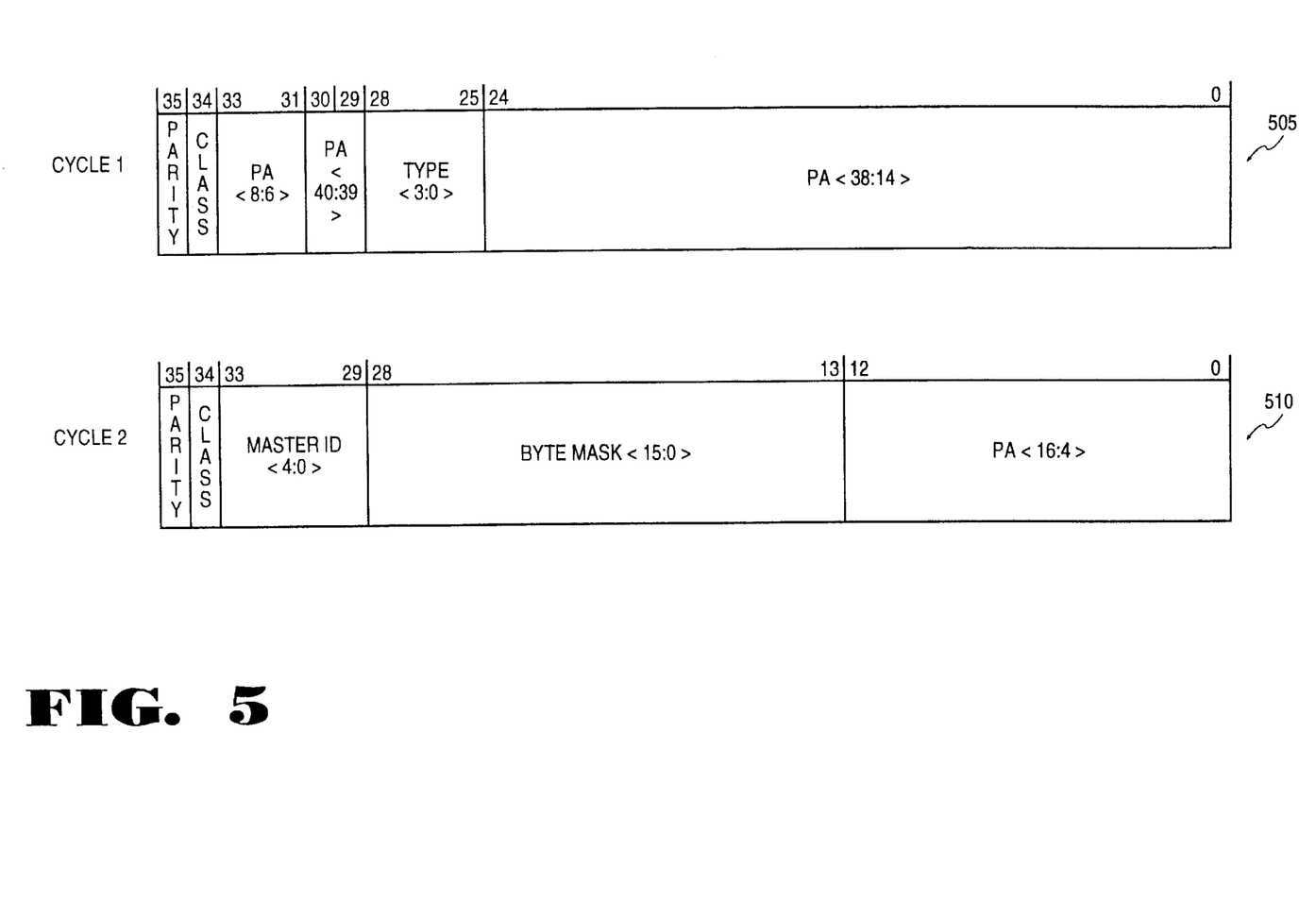
FIG. 5 shows the format of a non-cached transaction request packet according to one embodiment.
Figure 6:
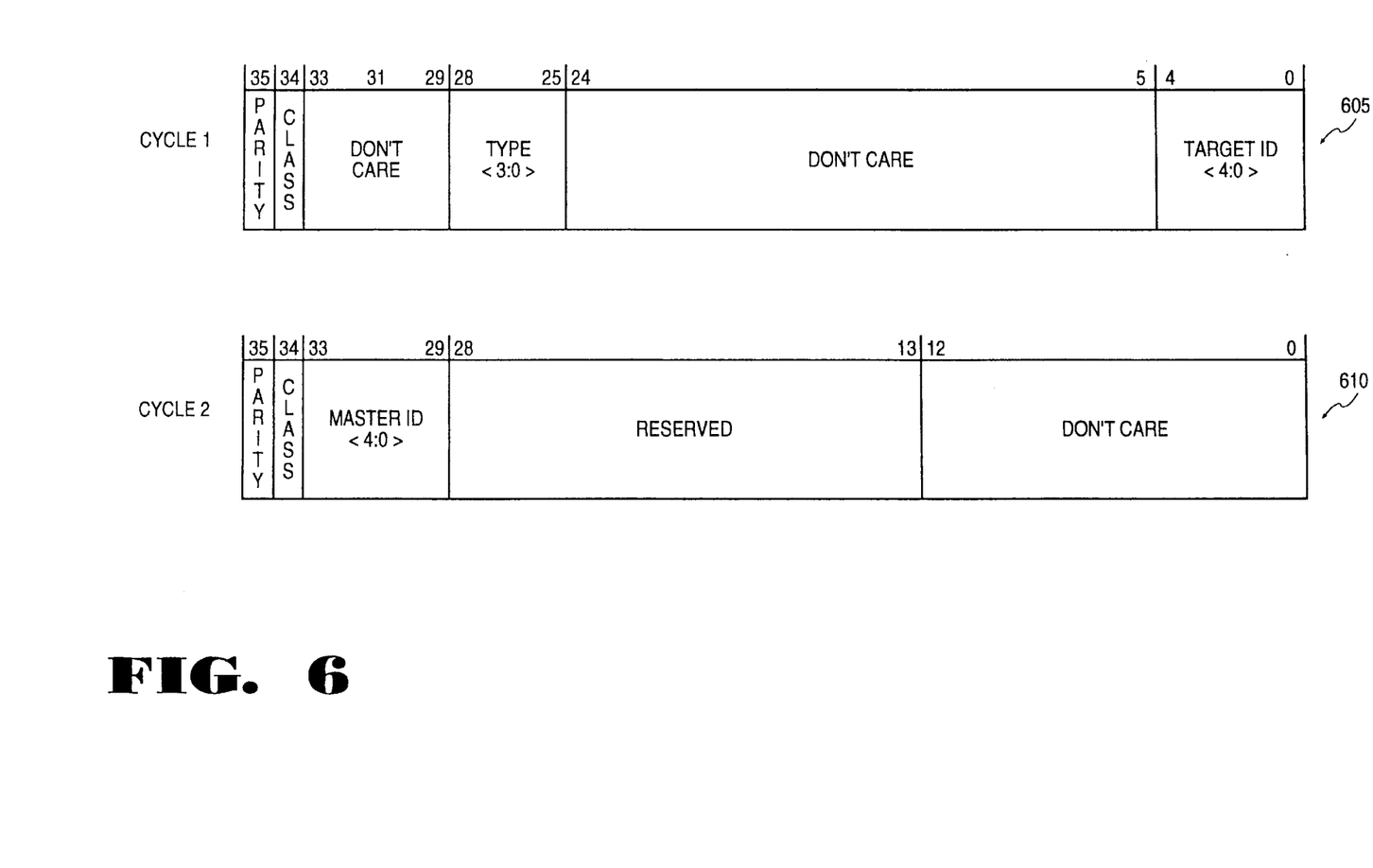
FIG. 6 shows the format of an interrupt transaction request packet according to one embodiment.

Exemplary formats of transaction request packets for use in computer system 10 are now discussed. The transaction set of computer system 10 include cache coherent transactions, non-cached transactions, and interrupt transactions, and FIGS. 4–6 show transaction request packet formats for cached transactions, non-cached transactions, and interrupt transactions, respectively. The physical address bits conveyed in the first cycle of the read and write transaction packets of FIGS. 4 and 5 are selected to provide bank select information, SIMM select information, and row address information. While brief descriptions of each of the fields of the various transaction request packets are provided, further details are available in the U.S. patent application Ser. No. 08/415,175 now U.S. Pat. No. : 5,634,068, which is referenced above.

FIG. 4 shows a transaction request format used for cache coherent transaction request initiated by either system controller 20 or a system component. Both the first cycle 405 and the second cycle 410 of a cache coherent transaction request packet include multiple fields. For the first cycle 405, a parity field occupies bit position 35, a class field occupies bit position 34, five bits of the physical address PA[8:6] and PA[40:39] occupy bit positions 29 through 33, a type field occupies bit positions 25–28, and twenty-five additional bits of the physical address PA[38:14] occupy bit positions 0 to 24. The class field identifies which of two master class queues in the requesting master that the transaction request packet has been issued from and is used to order execution of transaction requests. Expanding the width of the class field allows more master class queues to be discriminated between. The type field specifies what type of transaction is requested.

For the second cycle 410 of a cache coherent transaction request packet, a parity field occupies bit position 35, a class field occupies bit position 34, a master ID field occupies bit positions 29 to 33, a dirty victim pending ("DVP") field occupies bit position 28, bit positions 25 to 27 are reserved, an invalidate me advisory ("IVA") field occupies bit position 24, a no Dtag present ("NDP") field occupies bit position 23, bit positions 13 to 22 are reserved, and the remaining physical address bits PA[16:4] occupy bit positions 0 to 12. The NDP field is valid only in systems such as uniprocessor systems that do not use Dtags.

The five-bit master ID field is used to identify the requesting master, and system controller 20 uses this information to maintain ordering for transaction requests having the same master ID and for parallelizing requests having different master ID's. The DVP field is a dirty victim pending writeback bit that is set when a coherent read operation victimizes a dirty line. System controller 20 uses the DVP field for victim handling. The IVA field is used by a requesting master to send an "invalidate me advisory" during a component-initiated cache coherent write transaction in a system without Dtags. A requesting master sets the bit of the IVA field if the requesting master wants system controller to invalidate a cache line of the requesting master. The IVA field is ignored when system controller 20 uses duplicate tags. The NDP field is set by system controller 20 in system controller initiated packets only in a system without Dtags.

FIG. 5 shows the format of a transaction request packet for non-cached read and write transactions initiated by either system controller 20 or a system component. As shown, the format of a first cycle 505 is identical to the first cycle 405 of a cache coherent read or write transaction. Bit positions 29–35 of the second cycle 510 of the non-cached read or write transaction format are identical to bits 29–35 of the second cycle of a cache coherent transaction request packet. At bit positions 13–28, a sixteen bit byte mask field is defined. The byte mask field indicates valid bytes on the appropriate system address bus. Bit position 0 to 12 include physical address bits PA[16:4].

As shown in both FIG. 4 and FIG. 5, physical address bits PA[8:6] are provided during both cycles of the transaction request packet. According to the present embodiment, physical address bits PA[8:6] may be provided during the first cycle as bank select information for choosing one of multiple memory banks. The use of three bits allows a variety of different bank organizations for as many as eight memory banks. By providing the bank select information in the lower order physical address bits, bank interleaving may be accomplished by merely incrementing the physical address.

Physical address bits PA[8:6] are provided during the second cycle of the transaction request packet to provide "page mode" or "$\overline{CAS}$ only" memory accesses wherein the $\overline{RAS}$ signal remains asserted and $\overline{CAS}$ signals are selectively applied to different banks over successive cycles based on the incrementing of physical address bits PA[8:6]. To take full advantage of the page mode capability, a multiple cycle packet having three or more cycles may be defined wherein each of the cycles after the first cycle are similar to the second cycle defined above and include physical address bits PA[8:6]. Physical address bits PA[8:6] are toggled after the second cycle to selectively apply a $\overline{CAS}$ signal to the indicated memory bank.

Page mode memory accesses may also be supported over multiple transaction requests by merely comparing the row address contained in the first cycle of an incoming transaction request packet to the previous row address. The $\overline{RAS}$ signal for the previous transaction remains asserted. If there is a match between row addresses, a $\overline{CAS}$ signal may be applied immediately, reducing latency. If there is no match, the prior $\overline{RAS}$ signal is deasserted, and the appropriate $\overline{RAS}$ signal is asserted.

FIG. 6 shows the format of an interrupt transaction request packet initiated by system component. The first cycle 605 of the interrupt transaction request packet includes a parity field, a class field, a type field, and a target ID field. A target ID field is a five-bit field containing the master ID of the destination system component to which the interrupt request packet is to be delivered. The second cycle 610 of the interrupt request packet includes a parity field, a class field, and a master ID field. The master ID field is a five-bit field indicating the identity of the requesting master.

Figure 7:
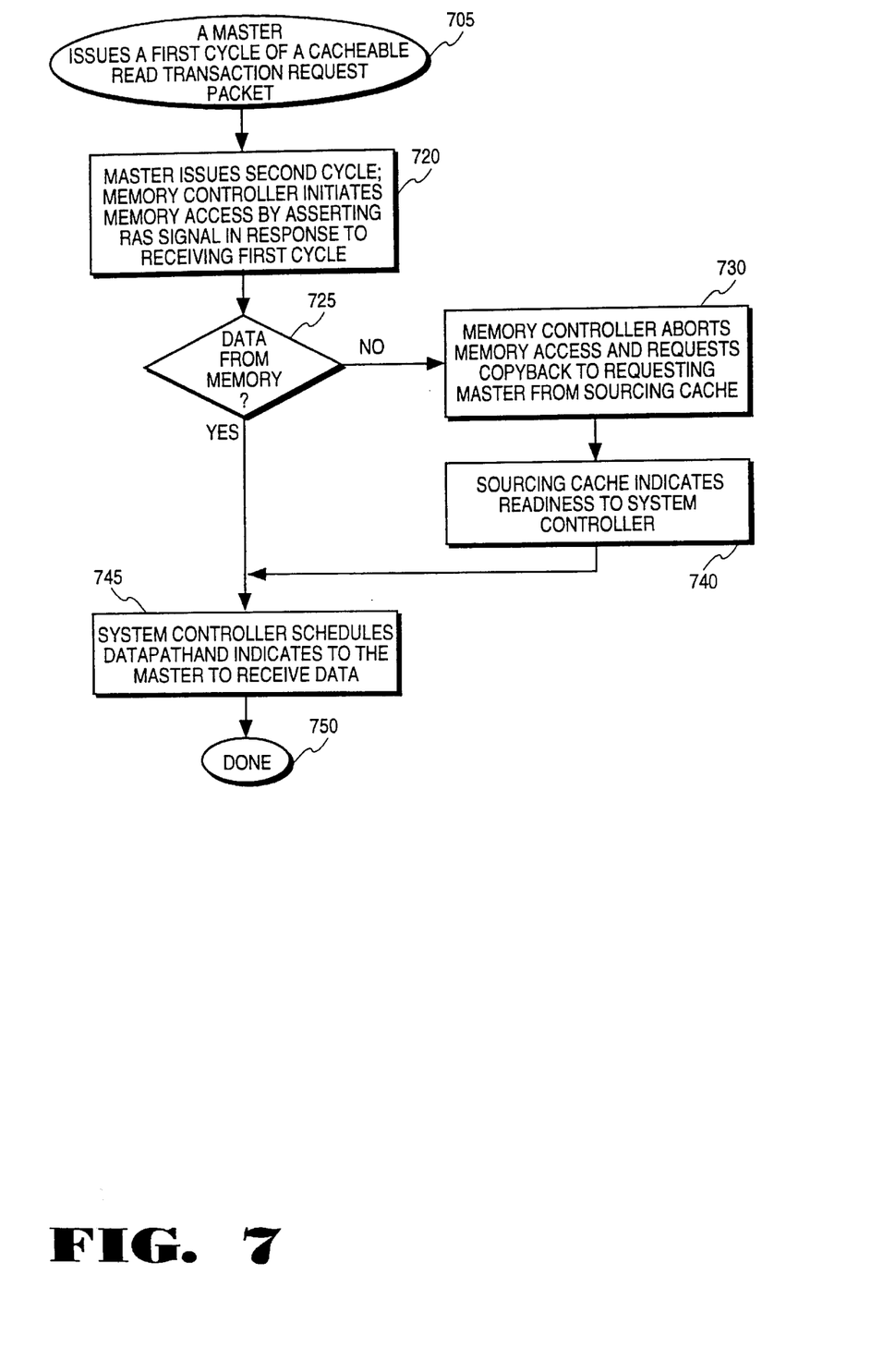
FIG. 7 is a flow chart for a cache coherent read transaction according to one embodiment.

The operation of the system address buses is now discussed with respect to FIG. 7. At process block 705, a master issues a first cycle of a cacheable read transaction request packet using its associated system address bus after the master has successfully arbitrated for control of the system address bus. The type field of the transaction request packet indicates to system controller 20 that the transaction request is a cache coherent request. At process block 720 the caching master issues the second cycle of the read transaction request packet, and the memory controller portion of system controller 20 initiates a memory access by asserting the appropriate $\overline{RAS}$ signal as determined from the bank select, SIMM select, and row address information included in the first cycle of the read request packet.

Cache coherency operations begin once the full physical address has been received, and the coherency controller of system controller 20 determines whether the data requested is to come from system memory or a cache at process block 725 by performing a "snoop-aside" wherein the system controller snoops the Dtags to determine whether the most recent copy of the requested data exists in another cache or in system memory. Cache coherency operations are performed within a constant time period and are completed prior to the time the $\overline{CAS}$ signal is to be asserted. If the data is contained in another cache in the system, system controller 20 aborts the memory access, and system controller 20 requests a copyback to the requesting master from another caching master at processing block 730. Memory accesses may be aborted by inhibiting the assertion of the $\overline{CAS}$ signal of the selected memory device.

At process block 740, the cache master that has been requested to source the data indicates that it is ready to source the data to system controller 20 via interconnect control lines 22. At process block 745, system controller 20 schedules a data path and data is delivered to the requesting master, and system controller 20 indicates to the requesting master that the requested data is available on the system data bus via interconnect control lines. The process ends at process block 750.

If data is to be sourced from system memory, system controller 20 completes the memory access by asserting the $\overline{CAS}$ signal of the selected memory device and schedules a data path to the requesting master at process block 745. System controller sends appropriate control signals via interconnect control lines 22 to the requesting master to indicate that its system data bus contains the requested data.

Figure 8:
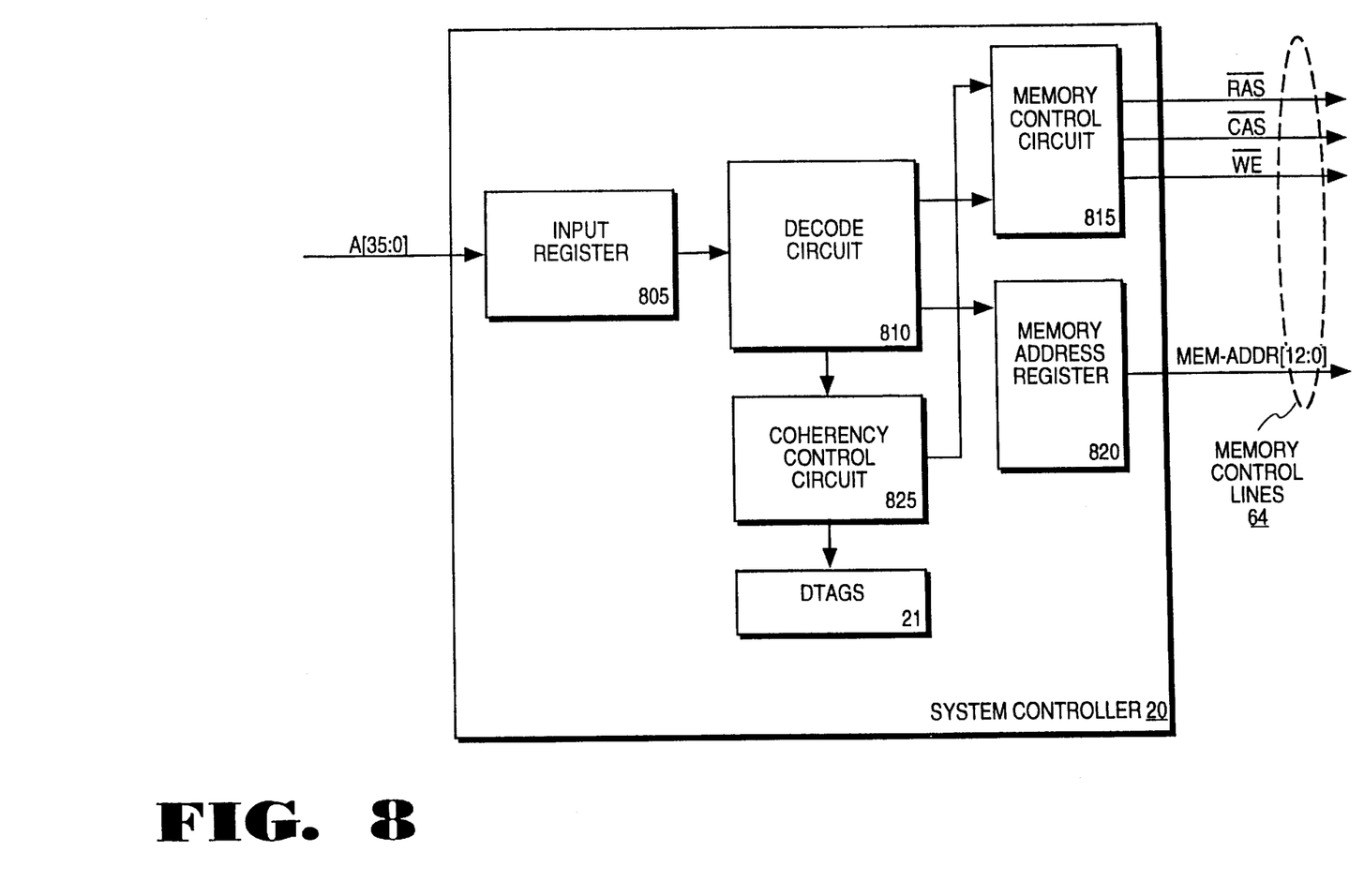
FIG. 8 shows a system controller according to one embodiment.

FIG. 8 shows a system controller 20 in more detail. As shown, the physical address sent as part of a transaction request packet is received via a system address bus and latched by input register 805 of system controller 20. A decode circuit 810 decodes the physical address to determine the transaction type and destination. When the transaction type is a cached memory access, decode circuit 810 forwards the memory address to memory address register 820. Input register 805 and memory address register 820 are clocked by the system clock of the interconnect. Decode circuit 810 also forwards control information designating which bank and SIMMs have been selected to control logic 815. Memory control logic 815 and memory address register 820 define the interface between system controller 20 and system memory.

FIG. 8 also shows coherency control logic 825 as being coupled to receive the memory address from decode circuit 810. Coherency control logic 825 snoops the Dtags 21 to determine if the data at the memory location indicated by the memory address is stored in a cache.

The output of memory address register 820 is coupled to a memory address bus MEM_ADDR[12:0] that is routed to all of the SIMMs of system memory. The memory address bus is multiplexed to carry the row address at a first time and to carry the column address during a subsequent time. The width of the memory address bus is selected to accommodate the maximum width of a row address or a column address, whichever is larger.

The output of memory control logic 815 are a number of $\overline{\text{RAS}}$, $\overline{\text{CAS}}$, and $\overline{\text{WE}}$ signal lines that are each point-to-point signal lines routed to individual memory devices. When a first cycle of a cache coherent read request packet is received by system controller 20, it is stored in input register 805, and decode circuit 810 decodes the physical address information to select the appropriate control signals of memory control logic 815. Decode circuit 810 forwards the memory address portion of the physical address information to memory address register 820, which outputs the memory address to be accessed. Memory control logic 815 asserts the $\overline{\text{RAS}}$ of the selected memory device, and the memory address bus carries the row address of the memory location to be accessed.

After the complete memory address is received, coherency control logic 825 snoops Dtags 21. All coherency operations are performed within a fixed number of clock cycles and completed prior to the time the $\overline{\text{CAS}}$ signal is to be asserted. If coherency control logic 825 determines that a cache is to source the requested data, coherency control logic 825 causes memory control logic 815 to abort the memory access. Memory accesses may be aborted by inhibiting the $\overline{\text{CAS}}$ signal. Coherency control logic 825 performs the coherency operations before it is time to assert a $\overline{\text{CAS}}$ signal such that no latency is added to the memory access.

Figure 9:
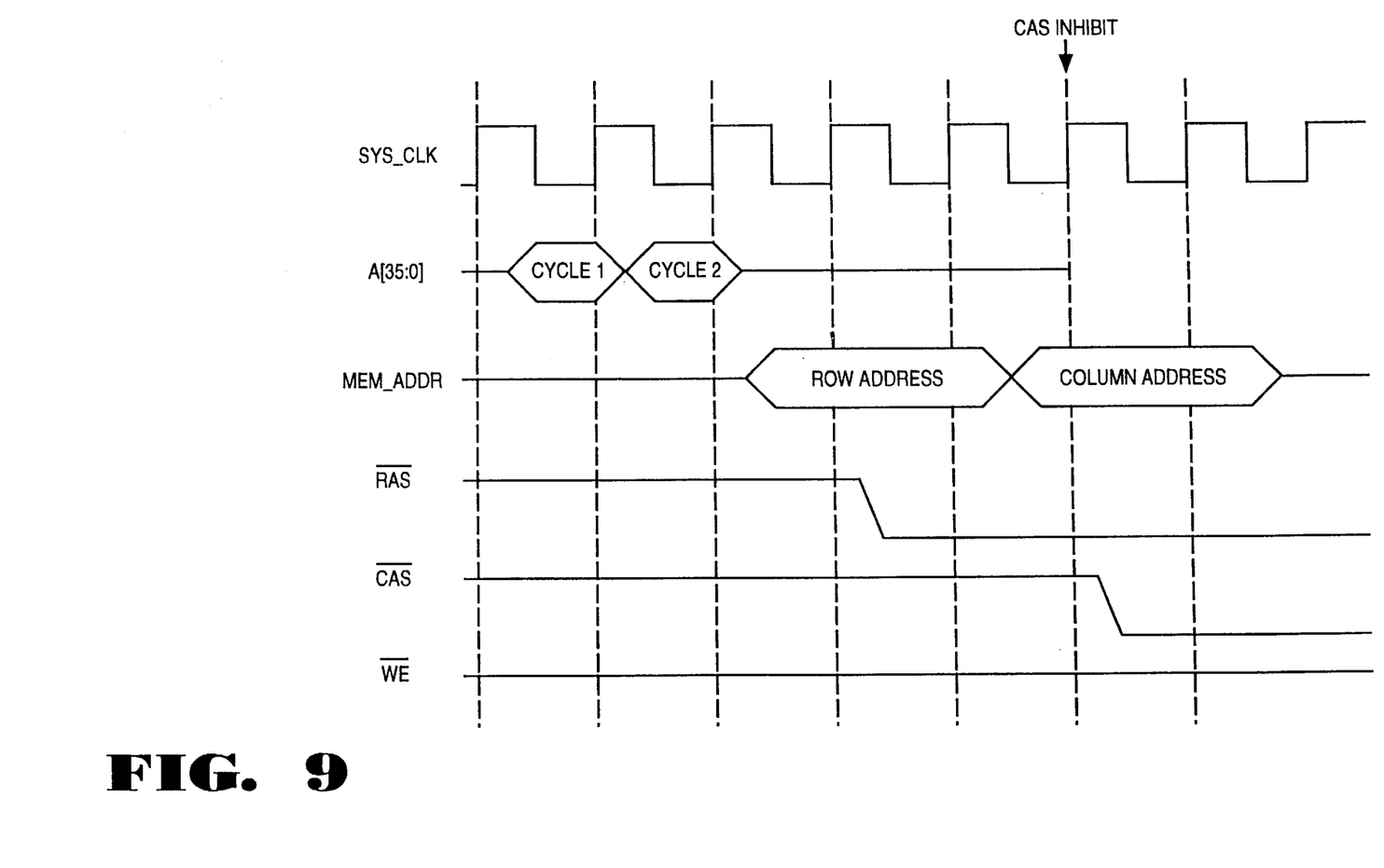
FIG. 9 is a timing diagram showing the operation of the system controller shown in FIG. 8.

FIG. 9 shows timing for the initiation of a memory read access according to one embodiment. As shown, the first and second cycles of a transaction request packet are sent during successive clock cycles of system clock signal Sys_Clk. There is latency associated with input register 805 and decode circuit 810 such that a full clock cycle passes from the receipt of the first cycle of the transaction request packet by system controller 20 during to the time when memory address register 820 latches the row address. The appropriate $\overline{\text{RAS}}$ signal is asserted low to initiate the requested memory access after sufficient time is allowed for the row address to settle. For this example a full clock cycle is inserted, but it is sufficient to wait for the duration of the row address setup time. The assertion of the $\overline{\text{CAS}}$ signal is shown as occurring two clock cycles after the $\overline{\text{RAS}}$ signal is asserted. If the coherency controller portion of system controller 20 determines that a cache is to source the data, the $\overline{\text{CAS}}$ signal is not asserted, and the memory access is aborted.

Figure 10:
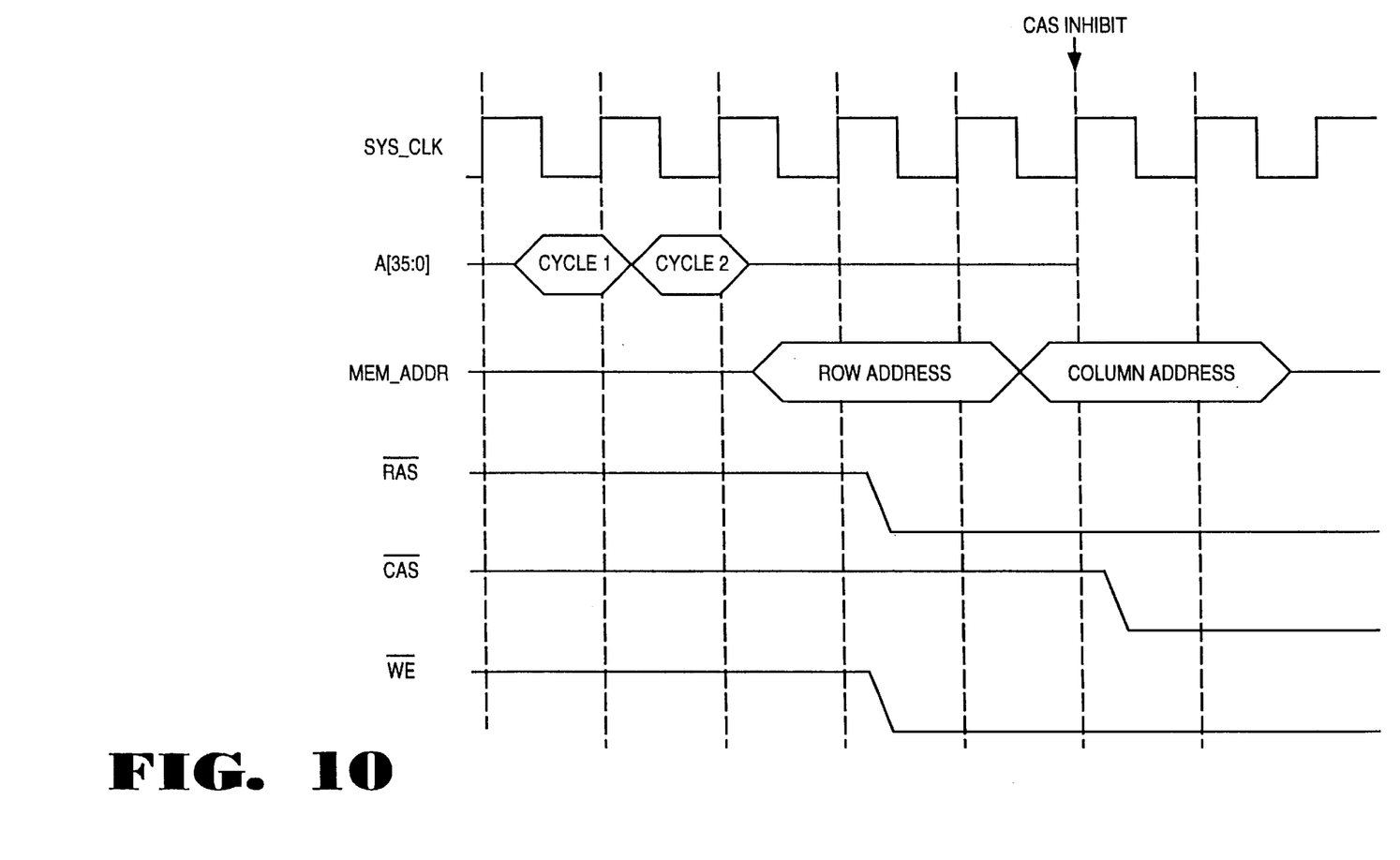
FIG. 10 is a timing diagram showing the operation of the system controller shown in FIG. 8.

FIG. 10 shows the timing for the initiation of a memory write access according to one embodiment. As shown, the first and second cycles of a transaction request packet are sent during successive clock cycles of system clock signal Sys_Clk. The appropriate $\overline{\text{RAS}}$ and $\overline{\text{WE}}$ signals are asserted low to initiate the requested memory write access after sufficient time is allowed for the row address to settle. The $\overline{\text{CAS}}$ signal is shown as being asserted two clock cycles after the $\overline{\text{RAS}}$ and $\overline{\text{WE}}$ signals are asserted. If the coherency controller portion of system controller 20 determines that the writeback is to be aborted, the $\overline{\text{CAS}}$ signal is not asserted.

Figure 11:
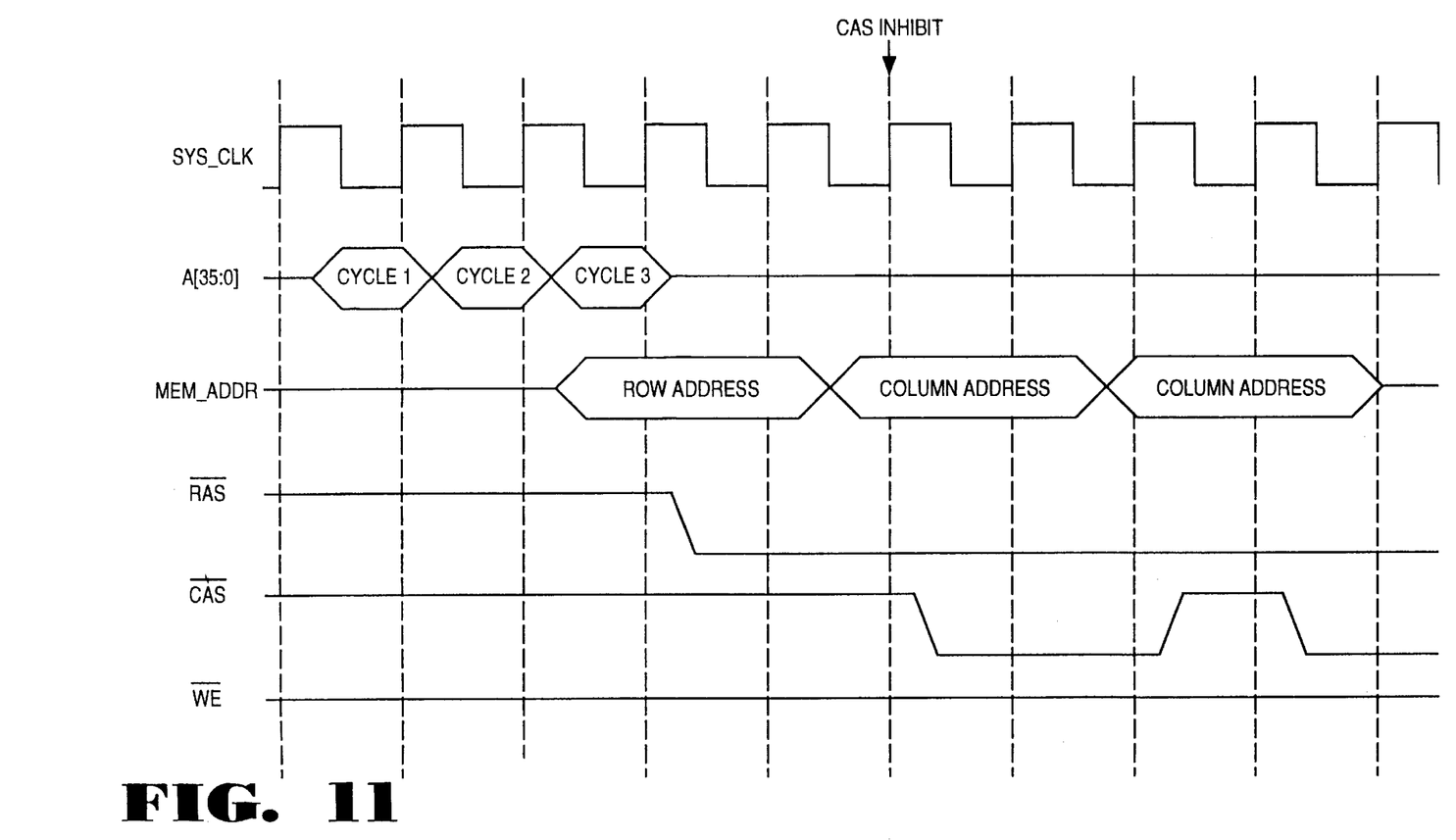
FIG. 11 is a timing digram showing the alternative operation of the system controller shown in FIG. 8.

FIG. 11 shows the timing for the initiation of a page mode read access. As shown, the transaction request packet may include three or more cycles wherein each of the cycles after the first cycle includes column address information for selecting a different column or bank of a memory page. The $\overline{\text{CAS}}$ signal is shown as being asserted for two clock cycles, deasserted for one clock cycle, and then asserted again, while the $\overline{\text{RAS}}$ signal remains asserted. The process continues in a similar manner for each new column address (or bank select information) that is provided. Because a different $\overline{\text{CAS}}$ signal is asserted in response to each column address, the $\overline{\text{CAS}}$ signal shown in FIG. 11 is a simplification that merely show that a $\overline{\text{CAS}}$ signal is asserted in response to the receipt of each new column address while the $\overline{\text{RAS}}$ signal remains asserted.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. In a multiprocessor cache coherent computer system including a plurality of masters and local caches coupled to a bus, each master having a corresponding local cache, a method for requesting transactions such that memory accesses are initiated quickly, comprising the steps of:

a master transmitting a first portion of a transaction request via the bus after performing a cache hit/miss determination on a corresponding local cache, the transaction request including multiple portions;

a memory controller initiating a memory read of a memory location indicated by the first portion of the transaction request prior to the memory controller receiving a second portion of the transaction request;

the master transmitting the second portion of the transaction request;

determining whether data stored at the memory location is to be read from a source other than the memory location by snooping the local caches of the computer system to determine whether a most recent copy of data stored at the memory location is stored in one of the local caches;

the memory controller aborting the memory read if the data is to be read from a source other than the memory location; and the memory controller completing the memory read if the data is to be read from the memory location.

2. The method of claim 1, wherein the first portion of the transaction request includes a row address portion of a memory address, the step of initiating the memory access comprising the step of applying a row address strobe signal to the memory location.

3. The method of claim 2, wherein the computer system includes system memory comprising a plurality of Single In-line Memory Modules (SIMMs) arranged in at least one bank, the first portion of the transaction request further including SIMM select information and bank select information, the step of the memory controller initiating the memory access further comprising the steps of:

selecting a bank of the system memory in response to the bank select information; and selecting a SIMM in response to the SIMM select information.

4. The method of claim 3, wherein each of the plurality of SIMMs has one of a plurality of possible SIMM sizes and there is a maximum number of SIMMs, the first portion of the transaction request including a first set of bits providing row address information and a second set of bits providing SIMM selection information, the first set being separate from the second set.

5. The method of claim 4, wherein the plurality of possible SIMM sizes includes 16 megabytes (MB), 32 MB, 64 MB, and 128 MB, the first set numbering thirteen bits and the second set numbering three bits, wherein the number of bits of the first portion actually used to convey the row information and the SIMM select information depends on the SIMM size and the number of SIMMs.

6. The method of claim 3, wherein each portion of the multiple portion transaction request includes bank select information in a first set of bits and row address information in a second set of bits, said first set being separate from said second set, the method comprising the further step of selecting a different bank if the bank select information of a particular portion is different than the bank select information of a previous portion.

7. The method of claim 1, wherein a cache controller performs the step of snooping caches by snooping a set of duplicate tags identical to tags maintained by the caches of the computer system.

8. The method of claim 1, wherein the second portion of the transaction request includes a column address portion of the memory address, the step of aborting the memory access comprising the step of inhibiting assertion of a column address strobe signal to the memory location.

9. The method of claim 1, wherein the first portion of the transaction request includes a type field, the method comprising the steps of:
   accessing the type field of the first portion of the transaction request to determine if the transaction request includes a cache coherency request;
   causing a coherency controller to receive the multiple portions of the transaction request if the transaction request includes a cache coherency request; and
   causing the coherency controller to determine whether the most recent copy of the data exists in one of the local caches or in the memory location.

10. A computer system comprising:
    a bus;
    a plurality of masters coupled to the bus, each master having a corresponding local cache, each master for issuing a transaction request via the bus after a cache hit/miss determination has been performed on a corresponding local cache, the transaction request comprising multiple portions;
    a memory;
    a memory controller coupled to the memory and to the bus, the memory controller for initiating a memory access of the memory prior to receiving a second portion of the transaction request in response to receiving the first portion of the transaction request; and
    a coherency controller coupled to the bus and the memory controller for determining whether the memory access is to be completed by snooping the local caches of the computer system.

11. The computer system of claim 10, wherein the first portion of the transaction request includes a row address portion of a memory address, the memory controller initiating the memory access by asserting a row address strobe signal.

12. The computer system of claim 11, wherein the memory access is a memory write operation, the coherency controller for determining whether data stored by one of the local caches is to be written to the memory, wherein the memory controller completes the memory access if coherency controller indicates that the data is to be written to the memory.

13. The computer system of claim 12, wherein the memory controller aborts the memory access by inhibiting assertion of a column address strobe signal to the memory location.

14. The computer system of claim 10, wherein the memory access is a memory read operation, the coherency controller for determining whether data stored at the memory location is to be retrieved from one of the local caches, wherein the memory controller aborts the memory access if the coherency controller indicates that data is to be retrieved from one of the local caches, and wherein the memory controller completes the memory access if coherency controller indicates that the data is to be read from the memory.

15. The computer system of claim 14, wherein the memory controller aborts the memory access by inhibiting assertion of a column address strobe signal to the memory location.

16. The computer system of claim 10, wherein the memory comprises a plurality of Single In-line Memory Modules (SIMMs) arranged in at least one bank, the first portion of the transaction request further including SIMM select information and bank select information, the memory controller initiating the memory access in response to the row information, the bank select information, and the SIMM select information.

17. The computer system of claim 16, wherein each of the plurality of SIMMs has one of a plurality of possible SIMM sizes and there is a maximum number of SIMMs, the first portion of the transaction request including a first set of bits providing row address information and a second set of bits providing SIMM selection information, the first set being separate from the second set.

18. The computer system of claim 17, wherein the plurality of possible SIMM sizes includes 16 megabytes (MB), 32 MB, 64 MB, and 128 MB, the first set numbering thirteen bits for carrying row information and the second set numbering three bits for carrying SIMM select information, wherein the number of bits of the first portion actually used to convey the row information and the SIMM select information depends on the SIMM size and the number of SIMMs.

19. The computer system of claim 16, wherein each portion of the multiple portion transaction request includes bank select information in a first set of bits and row address information in a second set of bits, said first set being separate from said second set, the memory controller for selecting a different bank if the bank select information of a particular portion is different than the bank select information of a previous portion.

20. The computer system of claim 10, wherein the transaction request comprises the first portion including a type field wherein the coherency controller performs a cache coherency operation if the type field indicates a cache coherency request.

21. The computer system of claim 10, wherein one of the multiple portions of the transaction request includes a master ID field to identify a requesting master.

* * * * *